United States Patent Office.

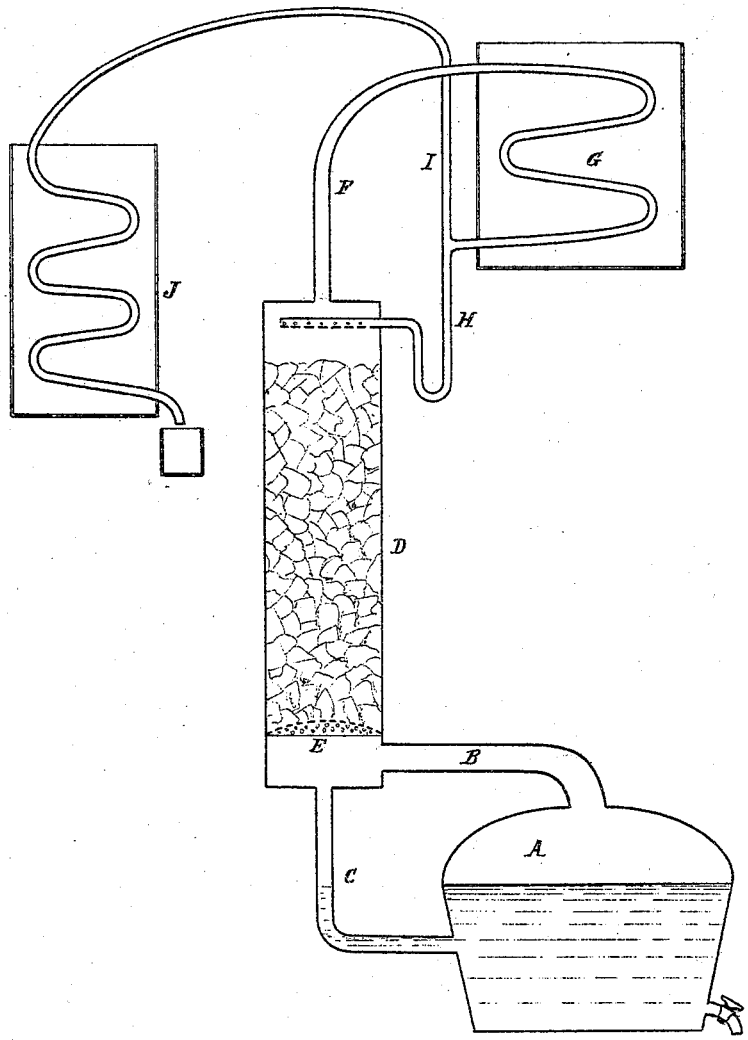

C. CHAUNCY PARSONS, OF NEW YORK, N. Y.

Letters Patent No. 110,997, dated January 17, 1871.

IMPROVEMENT IN APPARATUS FOR DISTILLING AND CONCENTRATING LIQUIDS.

The Schedule referred to in these Letters Patent and making part of the same.

*To whom it may concern:*

Be it known that I, C. CHAUNCY PARSONS, of the city, county, and State of New York, have invented certain new and useful Improvements in Apparatus for Distilling or Concentrating Liquids, of which the following is a specification.

My invention relates to apparatus for fractional distillation, or the separation of two liquids having different boiling-points, and it has special reference to the construction of the column through which the liquid or vapor is caused to pass.

In the ordinary alcohol-still the column is formed of an upright copper cylinder, with shelves across it at intervals, each shelf being covered with a thin layer of liquid, through which the vapor rising from the still is compelled to pass. This column is expensive, and from its nature cannot be used when the liquid or other substance to be distilled is of a corrosive nature.

My object has been to produce a simpler and cheaper column, and one fitted for uses and purposes for which the ordinary column cannot be employed, such, for instance, as concentrating acids or distilling corrosive material.

I find that a simple cylinder, of any suitable material, filled with small pieces of stone or brick, answers the purpose perfectly, the different layers of stone serving to act like the shelves in the ordinary column, while the apparatus is adapted as well to concentrate acids as to distill alcohol or other liquids.

The nature of my invention will be understood by reference to the accompanying drawing, which is a diagram of a still arranged to be used with a column of my improved construction.

In the drawing—

A represents a still of ordinary or suitable construction.

D is the column, composed of a cylinder made of any suitable material, and filled to a greater or lesser height with broken stone or equivalent material. I prefer a rough, porous stone, broken into pieces about the size of a horse-chestnut.

The pieces rest upon a perforated false bottom, E.

The still and column are connected by means of two pipes, B C, the former serving to convey the vapor from the still to the column, the latter serving to conduct the condensed liquid back into the still.

The vapor which reaches the top of the column is carried through a pipe, F, to a worm, G, in which all but the most volatile portions are condensed.

The liquid condensed in the worm enters a pipe, H, through which it is conveyed back to the column and scattered over the pieces of the stone.

The uncondensed portion is conveyed from the worm through a pipe, I, to a worm and tub, J, where it is finally condensed and runs off at K.

The still A being heated, the vapor passes up through the broken stone in the column, and out through the pipe F into the worm G, where it is condensed and runs back into the column, this operation being continued until the vapor becomes of such strength that the worm G will not condense it all, the non-condensed portion passing into the worm J, where it is finally condensed.

The condenser G is kept at a temperature which will condense all but the most volatile products of distillation.

When the apparatus is used for concentrating acids, that portion of the liquid remaining in the still A is to be retained, this being the concentrated acid, while the aqueous vapor escapes through the pipe I. If desired, a small stream of acid may be allowed to run in constantly at the top of the column, and the concentrated acid may be drawn off continually from the still.

The cylinder D may be made of metal or any other suitable material, and the filling may, as above stated, be of stone, brick, or other porous material.

The still and the worm or condensers may be of any ordinary or suitable construction.

What I claim as my invention, and desire to secure by Letters Patent, is—

1. The process, herein described, of concentrating liquids or separating liquids having different boiling-points, by passing the distilled vapor or the liquid to be concentrated, or both, through a column of porous material, such as porous stone, brick, or equivalent substance, substantially in the manner and for the purposes set forth.

2. In apparatus for distilling liquids or for separating liquids having different boiling-points, the employment of a column containing a porous material, substantially such as specified, through which the distilled vapor or the liquid to be concentrated is caused to pass.

3. The combination of the column, constructed as herein described, and the still, substantially as shown and set forth.

4. The column, constructed as described, in combination with the condensing-worm G, or other apparatus for condensing the vapor passing out from the column, substantially as set forth.

In testimony whereof I have signed my name to this specification before two subscribing witnesses.

C. CHAUNCY PARSONS.

Witnesses:
WM. TOBIN,
JOHN ARNOLD, Jr.